Sept. 25, 1928.  
J. H. HOLT  
REVIVIFYING FURNACE  
Filed Feb. 14, 1927  3 Sheets-Sheet 1
1,685,745
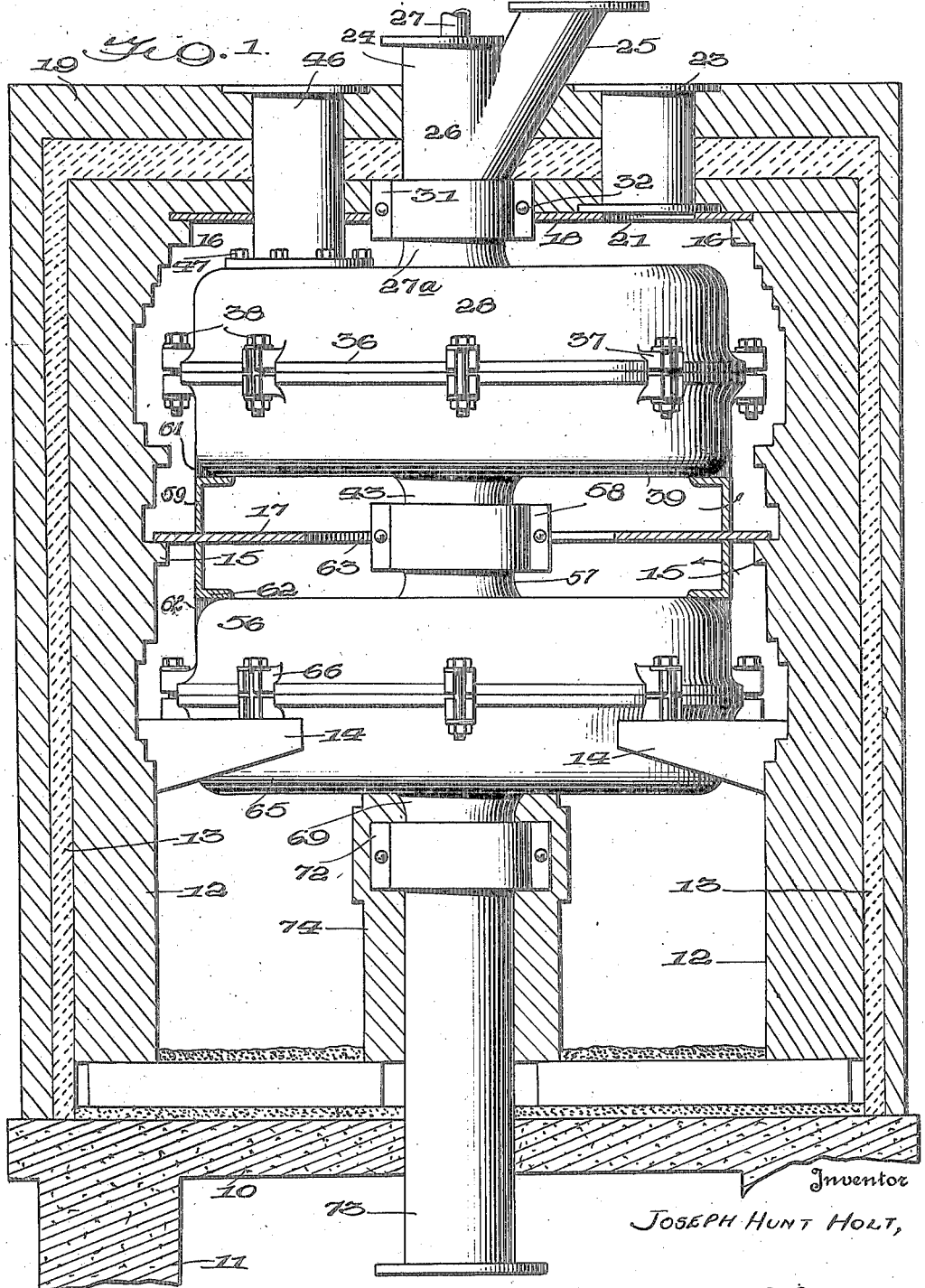
Inventor  
JOSEPH HUNT HOLT,  
By K.P. McElroy  
Attorney

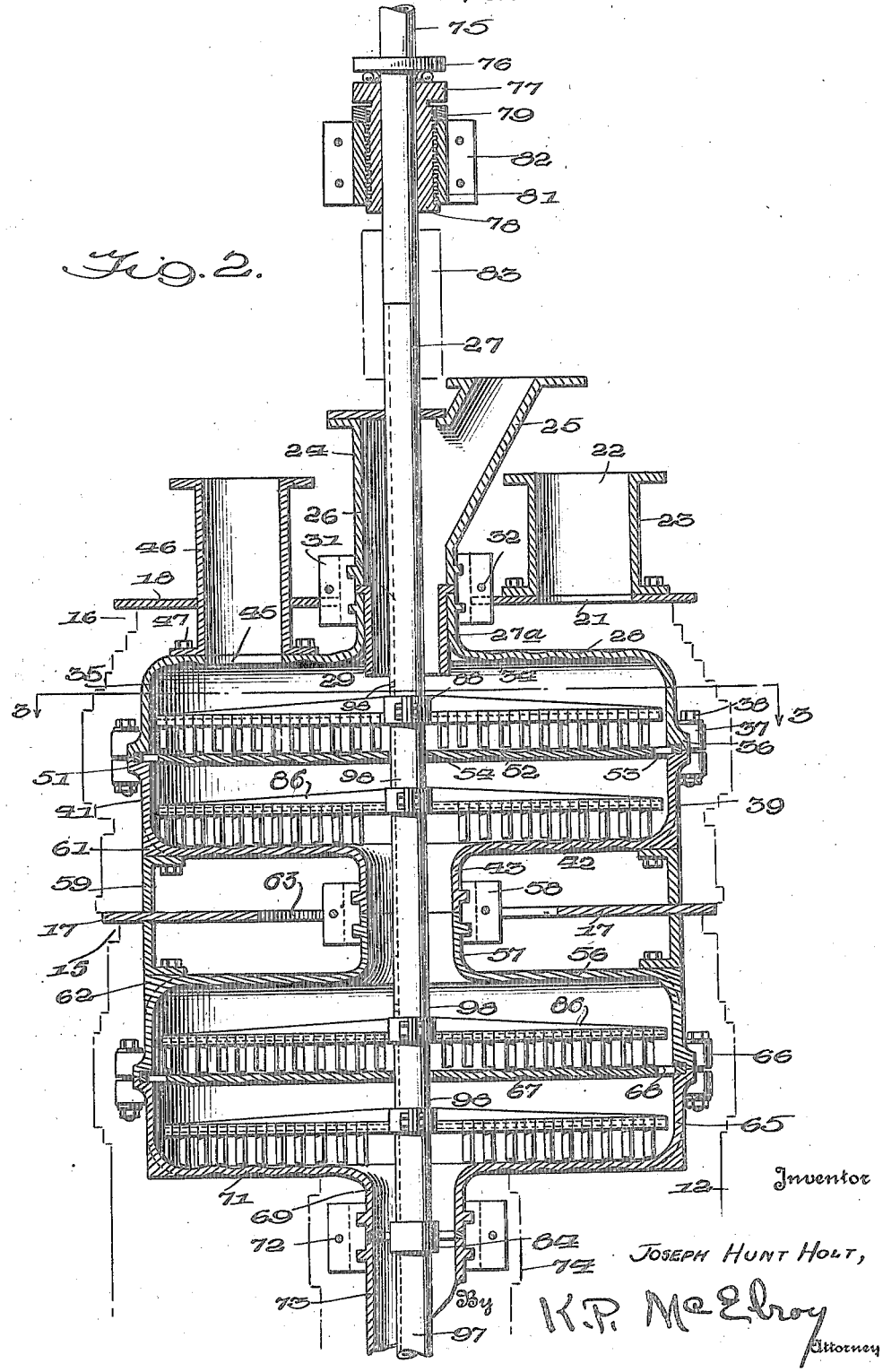

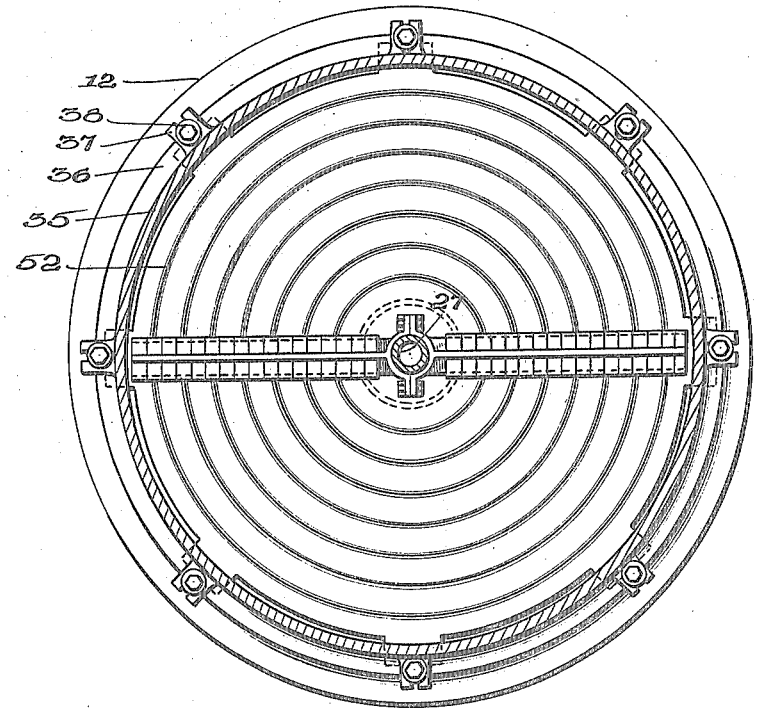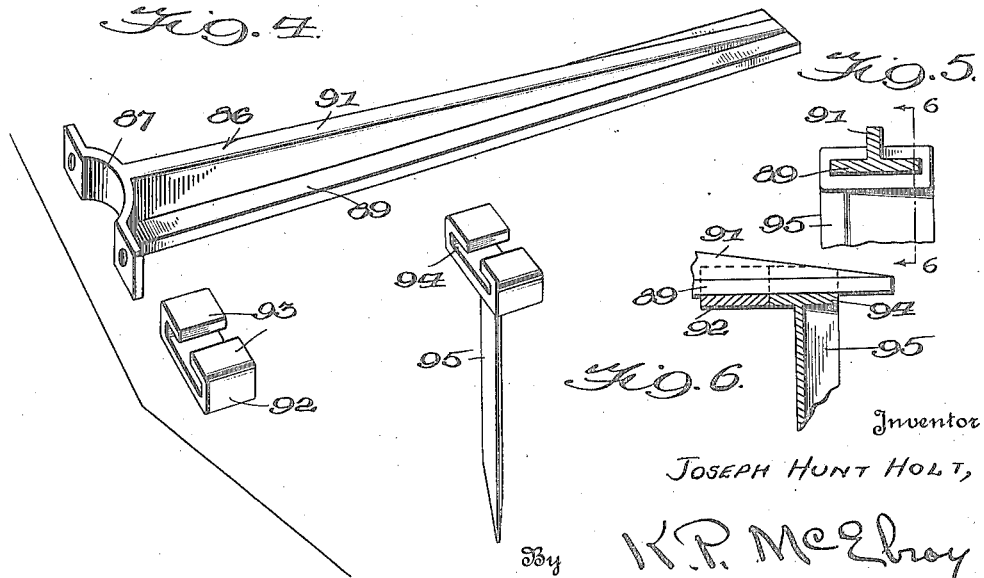

Patented Sept. 25, 1928.

1,685,745

UNITED STATES PATENT OFFICE.

JOSEPH HUNT HOLT, OF WILMINGTON, DELAWARE, ASSIGNOR TO DARCO CORPORATION, OF WILMINGTON, DELAWARE, A CORPORATION OF DELAWARE.

REVIVIFYING FURNACE.

Application filed February 14, 1927. Serial No. 168,194.

This invention relates to revivifying furnaces; and it comprises a furnace suitable for use in revivification or reactivation of decolorizing and filtering carbons, having a plurality of superimposed corrugated cylindrical shells with hearths or stages positioned therein, stirring means adapted to transfer carbon progressively from one stage to another, means to introduce carbon to be so transferred to the hearths, means permitting the discharge of carbon from the furnace, means permitting the escape of waste products, and means permitting the introduction and action of reactivating substances on the carbon; all as more fully hereinafter set forth and as claimed.

"Decolorizing carbon" is a term of the art applied to highly active carbon materials, used for purifying and removing coloring matter from raw sugar solutions and other liquids. After a period of use, this carbon loses its activity in removing coloring matter. Inert or spent carbons are ordinarily reactivated or revivified by subjecting them to a red heat, usually without access of air, and sometimes in the presence of steam or products of combustion or both. This treatment renders the material fit for further use.

The revivifying operation must, however, be conducted with considerable care, since otherwise complete reactivation will not be obtained; the treated product not having the high efficiency necessary. The types of apparatus, mostly retorts, heretofore employed have not yielded a product having an efficiency approaching that of the original material. Proper revivification requires a control of conditions not afforded by most of the apparatus proposed and in use.

It is the primary purpose of the present invention to provide a furnace or retort wherein exhausted carbon can be treated with observance of the necessary conditions and in a manner restoring to it practically its original activity and efficiency. To this end, I provide a plurality of metallic reaction chambers wholly surrounded by a heating atmosphere; all interior parts being in heat conducting relationship to the walls.

In the accompanying drawings showing a specific embodiment of my invention:

Fig. 1 is a side elevation of a furnace with a brick-work housing, a portion being broken away;

Fig. 2 is a fragmentary vertical cross-sectional view of the furnace of Fig. 1;

Fig. 3 is a cross-section taken along the line 3—3 of Fig. 2;

Fig. 4 is a view in perspective illustrating elements constituting a portion of a stirring mechanism;

Fig. 5 is a fragmentary transverse cross-section of a rake arm with a tooth positioned thereon; and Fig. 6 is a fragmentary cross-section taken along the line 6—6 of Fig. 5.

The construction illustrated in Fig. 1 comprises a brick housing including a foundation 10 above ground level and supported by concrete piers 11. Walls 12, formed of structural brickwork, and including tiers 13 of heat resistant or insulating bricks, extend upwardly from the foundation 10 to a height coextensive with the length of the furnace. The inner surfaces of walls 12 are indented at suitable distances to form recesses adapted to receive supporting brackets 14, and ledges 15 and 16, upon which are disposed plates 17 and 18, of steel or other heat resistant metal.

Plate 18 serves as a support for brickwork 19 forming a roof for the furnace. This plate is provided with an apertured portion 21 adapted to be aligned with the bore 22 of a pipe 23, built into the roof 19, providing an exhaust port for waste heating gases. It is desirable to build the inner walls of the brick housing close to but slightly spaced from, the outer wall of the furnace, and to seal the brickwork throughout its extent, in order to effect an efficient transfer of heat and to prevent the loss of hot gases.

Hopper 24, for introducing carbon to be treated, extends through roof 19 at about its center. This hopper is formed with an angularly disposed tubular portion 25 constituting an inlet for carbon, and with a vertically aligned tubular portion 26, primarily intended to receive a rotatable shaft 27. Any suitable means (not shown) may be employed to feed predetermined quantities of material into the member 25 at a uniform rate. Simple closures may be positioned over members 25 and 26.

The lowermost portion of hopper 24 terminates adjacent the level of the supporting plate 18 within roof 19, and is disposed concentrically and in contact with a flanged tubular member 27ª extending upwardly from a furnace section 28. A rigid connection is obtained between these members by disposing a sleeve 29 within the bore of the hopper 24 and the member 27ª, and embracing the assembly with a split clamping ring 31, provided with suitable means, such as bolts 32, to hold the parts in position.

Furnace section 28 is formed with a horizontally extending annular portion 34, provided with a plurality of concentric corrugations, and with a depending annular side wall portion 35 that need not be corrugated. The wall 35 terminates in an outwardly flaring annular flange 36, upon which is formed a plurality of circumferentially spaced perforated bosses 37 adapted to receive securing bolts 38, by means of which the section 28 is secured to a complementary furnace section 39. The section 39 has substantially the same configuration as the section 28, and it includes an annular side wall 41, a corrugated horizontally extending wall 42, and a concentrically disposed flanged tubular member 43 of materially less diameter than the section itself. When assembled with their annular flanged portions in juxtaposition, as illustrated in the drawings, the sections 28 and 39 form a cylindrical retort in which the carbon may be treated.

The upper section 28 differs from the remaining sections, such as the section 39, in that its horizontally extending portion 34 is provided with an aperture 45, adapted to be aligned with the bore of a pipe 46, secured to the section 28 by means of bolts 47, and projecting upwardly through the supporting plate 18 and the roof 19. The uninterrupted passage formed by these elements serves as a means of escape for waste gases, liberated within the furnace during operation.

The flanged portions of the sections 28 and 39 are formed with circumferentially extending recesses 51 which provide a shelf or ledge adapted to support a diaphragm, or what may be here called a hearth, 52 positioned between the sections. The hearth is formed from heat resisting metal, such as that used in the construction of the sections 28 and 39, and it is corrugated, in a manner similar to the horizontally extending walls 34 and 42, in order to permit of its expansion and contraction during operation without distorting the furnace as a whole to a degree sufficient to cause leakage. Nickel-chromium alloys have been used in construction and have proved desirable. Hearth 52 is provided with a plurality of perforations 53 adjacent its outer periphery, permitting the passage of the material treated to another portion of the furnace, and it is also provided with an aperture 54 at its center to permit the extension of the shaft 27 therethrough.

Disposed below, and in concentric relation with, the section 39, is another section 56, identical in its construction, but assembled in an inverted position with respect to the section 39. The section 56 is provided with a flanged tubular portion 57 of reduced diameter, similar to the reduced portion 43 formed on the section 39, around which is disposed a split clamping collar 58, that performs functions analogous to the collar 31. The sections 28 and 39 are, to a certain extent, supported upon and spaced from the section 56, by means of short spaced lengths of channel members 59 that are bolted, or otherwise secured, to annular flanged portions 61 and 62 disposed respectively adjacent the peripheries of the sections 39 and 56. The metallic annular plate 17, heretofore referred to as being positioned upon the ledge 15 of the brickwork housing, extends inwardly between the sections 39 and 56, and it is formed with a centrally disposed aperture 63, spaced from the clamping ring 58. The plate 17 serves as a baffle directing heating gas against the adjacent horizontal outer walls of the furnace sections throughout their extent.

A section 65, similar in construction to the section 39, is secured to the section 56 by means similar to those employed between the complementary upper sections. The bosses 66 on the lower sections, corresponding to the bosses 37 on the upper sections, bear upon the supporting brackets 14 mounted in the brickwork housing, and so provide additional means to secure the furnace in place. Disposed between the sections 56 and 65 is a corrugated hearth 67, provided with perforations 68 adjacent its outer periphery, and otherwise identical with the hearth 52. A reduced tubular portion 69 projects from the horizontally extending portion 71 of the section 65, and to it is connected, by means of a split clamping ring 72, a concentrically disposed pipe 73. The pipe 73 extends below the foundation 10, and to it may be secured a suitable receptacle (not shown) for the reception of treated carbon that is discharged therethrough. It is desirable to enclose the portion of the pipe 73, between the bottom wall 71 of the furnace and the founation 10, in brickwork 74, which serves to increase the rigidity of the structure and to prevent the carbon passing through the pipe from becoming overheated.

Spent carbon, introduced to the furnace through the hopper 25, is moved progressively to the successive stages or hearths by means of rakes mounted on the shaft 27. As best shown in Fig. 2, the shaft 27 is vertically disposed in concentric relation with the sections of the furnace and it projects therebeyond at each end. The upper portion 75 of the shaft has a collar 76 secured thereon which serves as a rotatable race ring for a ball-thrust bearing. A stationary race ring 77 is also concentrically disposed around the shaft 75 and is formed with an elongated portion 78, threaded on its outer surface, as indicated by the reference numeral 79. The threads are adapted to engage a bushing 81 threaded on its inner surface, secured in a split clamping ring 82 which is rigidly positioned by suitable supporting means (not shown).

It will be observed that the stationary race ring 77 may be rotated within the bushing 81 to alter the position of the shaft 27 with respect to the carbon-receiving hearths of the furnace. This adjustment provides a satisfactory means for positioning the rakes attached to the shaft 27 in a location best adapted to operate with a high efficiency. For obvious structural reasons it is advantageous to form the shaft 27 in two parts, which are connected without the furnace by means of a suitable coupling member, indicated schematically by the reference numeral 83. A sleeve bearing 84, disposed adjacent the lower flange member 69, surrounds the lower portion of the shaft 27 and serves to prevent oscillation thereof. Suitable gearing or driving means for the shaft 27 (not shown) may be secured to either extremity.

A stirring unit, or rake, is provided for each of the hearths 52, 42, 67 and 71. Each unit comprises a pair of arms 86, each having an overall length of substantially the radius of the furnace sections. The arms 86 are formed with flanged and circularly recessed portions 87 that are adapted to fit around the shaft 27, and to provide a split collar by means of which a pair of arms may be secured adjacent each of the hearths. Suitable means, such as bolts 88, may be employed to secure the oppositely disposed arms in position. Each arm 86 is formed with a horizontally disposed web 89 and with a vertically disposed rib 91 that tapers from a maximum thickness adjacent the curved portion 87 to substantially zero thickness at the outer extremity of the arm. This construction imparts to the arm a high rigidity and it also facilitates the assembly of the teeth of the rake.

Spacing members 92, having overhanging spaced flanges 93 adapted to engage the web 89 of the arm 86, are provided to space the teeth of the rake. Each tooth is formed with a flanged securing portion 94, similar in construction to the spacer 92, and with a downwardly projecting blade 95. The blade 95 extends diagonally with respect to the base of the clamping portion 94, and thus it is always turned in a non-radial direction with reference to the hearth or to the arm 86. The blades of the teeth on any juxtaposed pair of arms 86 are pointed in the same direction, but the blades on an adjacent pair of arms are turned in the opposite direction. In other words, the teeth on the arms disposed above the hearth 52 extend in such a direction that they force the carbonaceous material treated outwardly toward the apertures 53, whereas the teeth on the arms disposed adjacent hearth 42 are turned in the opposite direction, in order to direct the material inwardly toward the reduced apertured portion 43. In a like manner the blades of the teeth on the remaining pairs of arms are successively disposed in opposite directions, in order to feed the material outwardly and then inwardly on successive stages.

In the operation of the furnace, hot gases, generated below the section 65, flow upwardly around the lower sections, around the baffle plate 17 and the upper sections, and thence through the pipe 23 in a manner indicated by the arrows in Fig. 1. Carbonaceous material is fed through the hopper 25, and it flows downwardly through the successive hearths of the furnace and finally is discharged through the pipe 73. It will be observed that, with this system, the temperature of the treated carbon is gradually increased from a minimum at the upper portion of the furnace to a maximum on the lowermost hearth 71. In practice, the heating gases are at a temperature of about 1100° to 1400° F., although it is apparent that the actual temperature may vary over a wide range, depending upon the nature of the material treated. Due to the temperatures ordinarily employed, it is desirable to construct all of the exposed metal parts to heat resistant material, such, for example, as iron, nickel and chromium alloys, commonly known by the names of hybnickel or nichrome. The stirring mechanism supported from the shaft 27 should be so adjusted with respect to the hearths, and should be rotated at such a speed, as to move the treated material slowly across the hearth. The speed to be employed depends upon the nature of the carbon revivified.

Material disposed on the upper hearth 52 is slowly moved outwardly along the hearth and is finally discharged to the next hearth 42, on which it is moved in the opposite direction. It is to be observed that the temperature of the material is gradually increased by this method of operation. Material forced to the inner portion of the hearth 42 falls through the concentrically disposed tubular members 43 and 57 to the hearth 67 where it is again subjected to a stirring action at a progressively increasing temperature. The revivifying operation is practically completed when the material has reached the inner portion of the hearth 71 and it then falls through the pipe 73 into a suitable receiving device. If desired, the revivified carbon may be dropped into liquid for cooling and to prevent ignition.

Waste gases formed, during the heating of the carbon within the furnace, escape through the pipe 46 secured to the upper section 28.

If it be desired to treat the material with mild oxidants, such as steam, they may be introduced to the hearths by forming the shaft 27 with a longitudinally extending bore 97 and with radially disposed apertures 98 positioned just above the arms 86. Any suitable coupling device (not shown) may be employed to feed steam through the bore 97 and the apertures 98 into the furnace, where it may act in the desired manner upon the material. As an additional refinement, the apertures 98 may have radially extending tubular members secured thereto which are provided with downwardly extending jets by means of which the steam may be directed on the material on the hearths. Instead of steam, hot products of combustion may be used. A little air is sometimes mixed with the steam.

This type of furnace has been found to be highly efficient in regenerating or revivifying decolorizing carbon. It may also be used in reactivating other forms of carbon. The material is subject to constant agitation and to a gradually increasing temperature in a manner which avoids sudden overheating, resulting in condensing actions destroying the activity of the carbon. The corrugations formed in the hearths facilitate the agitation of the material and they also serve to prevent excessive strains caused by variations in the temperature of the various parts of the furnace. The material may be introduced and removed from the furnace without danger of contacting with fire gases.

What I claim is:—

1. Apparatus for the revivification of decolorizing carbon or the like comprising a plurality of metallic cylinders of relatively large diameter, connecting portions of materially less diameter extending between the cylindrical portions, hearths formed with apertured portions disposed within the cylinders, and stirring means positioned within the cylinders adjacent the hearths.

2. Apparatus for the revivification of decolorizing carbon or the like comprising a housing, a container mounted within the housing, said container being formed of a plurality of spaced cylindrical portions and interconnecting tubes disposed between the cylindrical portions, a baffle plate extending from the inner wall of the housing between said cylindrical portions adjacent said interconnecting tubes but spaced therefrom, said housing having an aperture formed therein on one side of said baffle plate to permit of the entrance of heating gases within the housing and into contact with the container, said housing having a second aperture formed therein on the opposite side of the baffle plate to permit of the escape of heating gases, the housing being spaced from the container to permit the heating gases to flow in proximity to the container during their passage through the housing.

3. Apparatus for the revivification of decolorizing carbon or the like comprising a cylindrical member having a plurality of hearths positioned therein, perforations formed on the marginal portions of the hearths, a rotatable shaft extending through the cylindrical portion and disposed concentrically therewith, rakes secured to the shaft adjacent the hearths, and means to adjust the position of the shaft and the rakes with respect to the hearth.

4. Apparatus for the revivification of decolorizing carbon or the like comprising an enclosed housing having an aperture formed at one end thereof for the admission of heating gases and a second aperture formed at the opposite end thereof permitting the escape of spent heating gases, and a carbon-receiving container totally disposed within the housing but spaced from the walls thereof, said container consisting of a plurality of cylindrical sections of relatively large diameter and connecting tubes extending between said sections, whereby heating gases may contact with said container at all points thereof.

5. Apparatus for the revivification of decolorizing carbon or the like comprising a container composed of spaced cylindrical sections of relatively large diameter interconnected by tubes of relatively small diameter, means for heating the container throughout its extent, a shaft extending within the container, stirring means secured to the shaft within the cylindrical portions of relatively large diameter, said shaft being formed with a hollow portion for the admission of revivifying fluid, and means connected to said hollow shaft adjacent the stirring means for distributing the revivifying fluid to the carbon in the cylindrical portions.

In testimony whereof, I have hereunto affixed my signature.

JOSEPH HUNT HOLT.